US010315479B2

(12) United States Patent
Ranjan et al.

(10) Patent No.: US 10,315,479 B2
(45) Date of Patent: Jun. 11, 2019

(54) DYNAMICALLY ADJUSTABLE SUSPENSION DEVICE

(71) Applicant: KPIT CUMMINS INFOSYSTEMS LIMITED, Pune (IN)

(72) Inventors: Ravi Ranjan, Pune (IN); Pranjali Modak, Pune (IN)

(73) Assignee: KPIT TECHNOLOGIES LTD., Pune (IN)

( * ) Notice: Subject to any disclaimer, the term of this patent is extended or adjusted under 35 U.S.C. 154(b) by 96 days.

(21) Appl. No.: 14/904,019

(22) PCT Filed: Jun. 3, 2014

(86) PCT No.: PCT/IN2014/000379
§ 371 (c)(1),
(2) Date: Jan. 8, 2016

(87) PCT Pub. No.: WO2015/004676
PCT Pub. Date: Jan. 15, 2015

(65) Prior Publication Data
US 2016/0152107 A1    Jun. 2, 2016

(30) Foreign Application Priority Data

Jul. 11, 2013   (IN) .......................... 2338/MUM/2013

(51) Int. Cl.
*F16F 3/04*      (2006.01)
*F16F 9/46*      (2006.01)
(Continued)

(52) U.S. Cl.
CPC ........... *B60G 15/065* (2013.01); *B60G 17/08* (2013.01); *F16F 3/04* (2013.01); *F16F 9/462* (2013.01);
(Continued)

(58) Field of Classification Search
CPC ........ F16F 3/04; F16F 9/06; F16F 9/18; F16F 9/462; F16F 9/516; F16F 9/0209;
(Continued)

(56) References Cited

U.S. PATENT DOCUMENTS 4,685,698 A * 8/1987 Klinkner .............. B60G 17/018
                                                    188/266.2
5,337,864 A * 8/1994 Sjostrom ................ B60G 13/18
                                                    188/266.2
(Continued)

FOREIGN PATENT DOCUMENTS

CN        102729760      10/2012
DE          938638        2/1956
(Continued)

OTHER PUBLICATIONS

Englished machined translation of DE-102009004156, (Description only).*

(Continued)

*Primary Examiner* — Robert A. Siconolfi
*Assistant Examiner* — San M Aung
(74) *Attorney, Agent, or Firm* — Foley & Lardner LLP

(57) ABSTRACT

The present invention discloses a dynamically adjustable suspension device including one or more springs having similar or different spring rates, where said one or more springs are arranged in a pre-defined configuration, and a dynamically adjustable damper. The dynamically adjustable damper, includes a rotatable knob coupled to the dynamically adjustable damper to change the damping coefficient dynamically in real-time, means to rotate the knob so as to adjust damping coefficient in real-time while the dynamically adjustable suspension device being used, means to identify compression of the one or more springs by sensing (Continued)

one or more positions of the springs, between a fully elongated state and a fully compressed state in real-time.

23 Claims, 11 Drawing Sheets

(51) Int. Cl.
    *B60G 15/06*     (2006.01)
    *B60G 17/08*     (2006.01)
    *F16F 15/02*     (2006.01)

(52) U.S. Cl.
    CPC ...... *F16F 15/022* (2013.01); *B60G 2202/322* (2013.01); *B60G 2204/62* (2013.01); *B60G 2400/252* (2013.01); *B60G 2401/176* (2013.01); *B60G 2500/10* (2013.01); *B60G 2600/18* (2013.01); *B60G 2600/20* (2013.01); *B60G 2600/202* (2013.01)

(58) Field of Classification Search
    CPC ...... F16F 15/022; F16F 15/03; F16F 2232/04; F16F 2232/06; B60G 9/00; B60G 11/15; B60G 11/50; B60G 11/58; B60G 13/001; B60G 13/14; B60G 15/062; B60G 15/065; B60G 17/06; B60G 17/08; B60G 17/015; B60G 17/018; B60G 17/021; B60G 17/0152; B60G 17/0157; B60G 17/0165; B60G 99/02; B60G 2202/12; B60G 2202/32; B60G 2202/40; B60G 2202/42; B60G 2202/44; B60G 2202/312; B60G 2202/442; B60G 2204/62; B60G 2204/129; B60G 2204/419; B60G 2204/422; B60G 2206/41; B60G 2400/91; B60G 2400/102; B60G 2400/206; B60G 2400/252; B60G 2300/60; B60G 2401/176; B60G 2500/10; B60G 2500/104; B60G 2600/02; B60G 2600/18; B60G 2600/20; B60G 2600/71; B60G 2600/184; B60G 2600/202; B60G 2800/162; B60G 2800/916; B60K 5/1208; B60N 2/501; B60N 2/502; B60N 2/505; B60N 2/522; B60N 2/525
    USPC ........... 267/140.11, 220, 225–226, 290, 217; 188/266.1, 266.2, 266.4, 282.4, 290, 316; 188/378; 701/37–38
See application file for complete search history.

(56) References Cited

U.S. PATENT DOCUMENTS

| | | | | |
|---|---|---|---|---|
| 5,347,457 A | * | 9/1994 | Tanaka | B60G 17/0164 280/5.514 |
| 5,350,187 A | | 9/1994 | Shinozaki | |
| 5,521,821 A | * | 5/1996 | Shimizu | B60G 17/015 188/266.4 |
| 5,522,482 A | * | 6/1996 | Kashiwagi | B60G 17/015 188/266.4 |
| 5,802,486 A | * | 9/1998 | Uchiyama | B60G 17/0165 280/5.515 |
| 5,859,692 A | * | 1/1999 | Ross, Jr. | B60G 17/01933 267/64.19 |
| 9,162,548 B1 | * | 10/2015 | Wakeman | B60G 15/065 |
| 2002/0038929 A1 | | 4/2002 | Now | |
| 2004/0254701 A1 | | 12/2004 | LaPlante et al. | |
| 2007/0255466 A1 | * | 11/2007 | Chiao | B60G 17/0152 701/37 |
| 2009/0065314 A1 | * | 3/2009 | Kondo | B60G 13/001 188/290 |
| 2009/0072460 A1 | * | 3/2009 | Michel | B60G 11/50 267/225 |
| 2010/0096788 A1 | * | 4/2010 | Farahati | F16F 15/13484 267/140.13 |
| 2011/0291338 A1 | * | 12/2011 | Pepka | F16F 3/04 267/225 |
| 2012/0187640 A1 | * | 7/2012 | Kondo | B60G 11/58 280/5.514 |
| 2013/0127101 A1 | * | 5/2013 | Rasbach | B60G 9/00 267/290 |
| 2014/0070468 A1 | * | 3/2014 | Leonard | B60G 11/27 267/64.27 |

FOREIGN PATENT DOCUMENTS

| | | | |
|---|---|---|---|
| DE | 19830922 | | 1/2000 |
| DE | 102009004156 | * | 7/2010 |
| EP | 1743787 | | 1/2007 |
| GB | 2262583 | | 6/1993 |
| JP | S5683633 | | 7/1981 |
| JP | S6124608 | | 2/1986 |

OTHER PUBLICATIONS

William F. Milliken; Douglas L. Milliken "Race Car Vehicle Dynamics", Dec. 1, 1994.
International Search Report dated Dec. 12, 2014 regarding Application No. PCT/IN2014/000379 (5 pages).

* cited by examiner

DYNAMICALLY ADJUSTABLE SUSPENSION DEVICE

CROSS-REFERENCE TO RELATED APPLICATIONS

The present application is a National Phase of PCT Application No. PCT/IN2014/000379, filed Jun. 3, 2014, which claims priority to and the benefit of the following patent application: Indian Patent Application No. 2338/MUM/2013, filed Jul. 11, 2013, the disclosure of which is incorporated herein by reference in its entirety.

FIELD OF THE INVENTION

The present invention relates to suspension system in general, and more particularly relates to a dynamically adjustable suspension device.

BACKGROUND OF THE INVENTION

The vehicles running on roads have to fulfil one basic requirement which is—riding comfort of the passengers with best handling characteristics. The riding comfort relies mostly on the suspension system provided in the vehicle for absorbing shocks. Generally, the suspension systems comprise various arrangements of coil springs with a damper. The coil spring of any suspension is selected based on type of terrain vehicle. For off road vehicles, which are designed to travel on uneven roads, stiffness (k) of coil spring is higher whereas, for highway road conditions where roads are smoother, stiffness (k) of the coil spring is lower. In other words, suspension built for off road vehicles needs to be tough, while suspension built for on road vehicles should be smooth.

However, this arrangement restricts the use of vehicles to certain terrains depending on the type of suspension provided. In patchy roads, the suspension built for highway road conditions may not provide the required comfort for the passengers by absorbing shocks from the patchy roads as the stiffness (k) of the coil spring in the suspension is lower. Similarly, on highway road conditions, the suspension built for off road vehicles may not provide comfort of a sedan for passengers as the stiffness of the suspension is higher.

The present state of the art does not provide for a dynamically adjustable vehicle suspension device. Therefore, there is need for a suspension device which self-adjusts in real-time while the vehicle is running, to suit the terrain in which the vehicle is being driven and provides maximum comfort to the rider. Additionally, there is a need for a dynamically adjustable system for a coil spring suspension type. Vehicle comfort level required by each passenger may be different. As such, there is a need for a suspension system in which the user is able to set the level of comfort provided by the suspension system as per his/her needs.

SUMMARY OF THE INVENTION

The present invention provides for a dynamically adjustable vehicle suspension device, including one or more springs having at least one spring rate, wherein said one or more springs are arranged in a pre-defined configuration, and a dynamically adjustable damper. The dynamically adjustable damper, includes a rotatable knob coupled to the dynamically adjustable damper to change orifice diameter of the dynamically adjustable damper, thereby changing the damping coefficient dynamically in real-time, means to rotate the knob so as to adjust damping coefficient in real-time while the dynamically adjustable suspension device being used, means to identify compression of the one or more springs by sensing one or more positions of the springs, between a fully elongated state and a fully compressed state in real-time, wherein, the damping coefficient being dependent on compression of the one or more springs, thereby, the one or more springs and the dynamically adjustable damper work in tandem to provide an optimized suspension, wherein, both, the one or more springs and the dynamically adjustable damper are critically damped at all point.

In an aspect of the invention, a vehicle having the dynamically adjustable vehicle suspension device is also provided with a user interface to adjust suspension performance of the dynamically adjustable suspension device to suit one of a terrain type, age of vehicle, age of suspension, payload of the vehicle and the like.

The present invention enables the dynamic adjustment of the suspension device in such as, but not limited to, vehicles, robots, and platforms requirement shock absorption. The present invention enables the real-time dynamic adjustment of the suspension device according to the terrain where vehicle is being driven. The dynamic adjustment refers to the tuning of the suspension device to provide a varying degree of comfort to the passengers at run-time, while the vehicle is running, depending on factors that affect the suspension system such as, but not limited to, road conditions, terrain, vehicle condition, and payload of the vehicle.

BRIEF DESCRIPTION OF THE ACCOMPANYING DRAWINGS

DETAILED DESCRIPTION OF THE INVENTION

The present invention discloses a dynamically adjustable suspension device having multiple coil springs and a dynamically adjustable damper, which is deployed in such as, but not limited to, various vehicle types, robots, platforms and machineries requiring shock absorber system or isolation from terrain. The multiple coil springs and the dynamically adjustable damper work in tandem to provide an optimized suspension in a real-time. The multiple coil springs having similar or different spring rates are arranged in a pre-defined configuration to provide a variable spring rate along with a dynamically adjustable damping coefficient to provide the optimized suspension and comfort to the passenger of the vehicle. Most importantly, the suspension device adjusts itself automatically in real time, while the vehicle is in motion, depending on factors such as, but not limited to, road conditions, terrain, vehicle condition, and payload of the vehicle. Alternatively, the driver can adjust the suspension device in real time, while the vehicle is in motion, to suit his/her requirements of the amount of comfort provided by the suspension device. The dynamically adjustable suspension device is adjustable so as to provide a variable suspension comfort in various types of road terrains, like but not limited to, off road conditions and highway road conditions. The combination of coil springs provide a varying stiffness to absorb shocks in patchy road conditions and provide a smoother ride in all types of terrain.

In a conventional shock absorber, the stiffness of the coil spring is designed based on type of vehicle in which the shock absorber is going to be used. That is, stiffness (K) is small, if the shock absorber employing the coil spring is designed for highway road conditions. On the other hand, the stiffness (k) is higher, if the shock absorber employing the coil spring is designed for off road conditions. Since, the stiffness (K) is either higher or lower based on the type of vehicle in which the shock absorber is going to be used, the shock absorber with coil spring of fixed stiffness and a fixed damping coefficient, is not dynamically adjustable. This is not suitable for roads with non-uniform terrain.

Throughout the document, the terms 'stiffness of the coil spring' and 'spring rate' are used interchangeably in the context of the invention. The term 'dynamically adjustable damper' refers to a damper whose dampening coefficient is varied dynamically, while the vehicle is in motion, based on the amount of coil spring compression identified or based on the level of comfort required by the rider.

Figure 1:
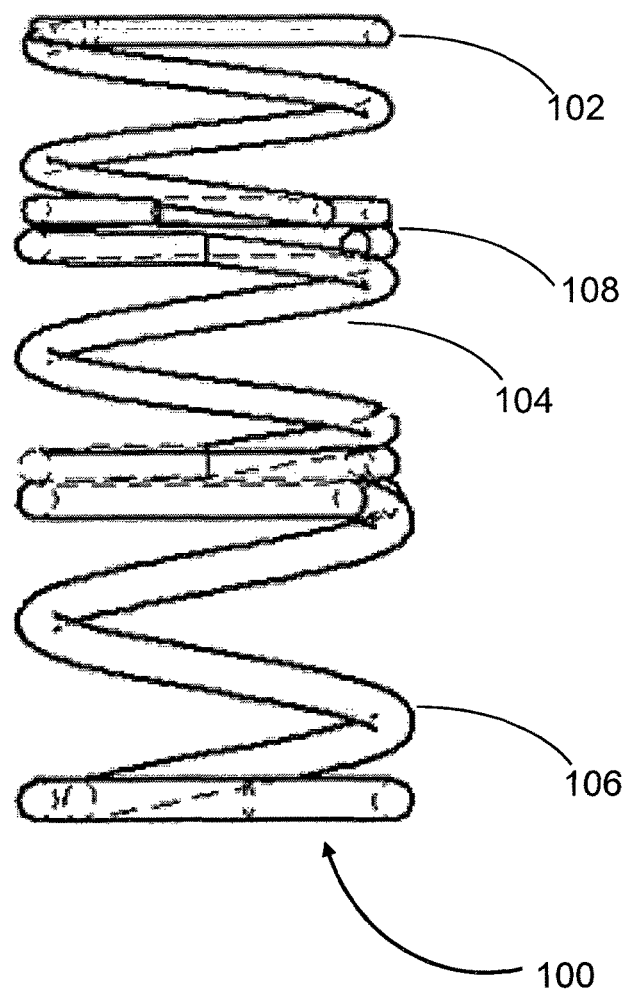
FIG. 1 illustrates a schematic representation of a shock absorber employing multiple series coil spring of variable stiffness, according to one embodiment.

FIG. 1 illustrates a schematic representation of the dynamically adjustable suspension device employing multiple coil spring of variable stiffness arranged in series, according to one embodiment of the invention. As shown in FIG. 1, the shock absorber 100 employs a combination of 3 coil spring (102, 104, and 106). These three springs arranged in series have same coil diameter but different cross sectional wire diameter so as to provide a variable stiffness/spring rate. For example, the spring coils have stiffness varying from K1, 102 (softest) to K3, 106 (hardest), due to their varying wire diameters. For example, when the vehicle employing the shock absorber 100 encounters smaller bumps, the coil spring 102 having lower stiffness absorbs the shock from the bumps while the remaining coils springs 104 & 106 acts as a rigid link. Further, when the vehicle encounters a larger bump, the coil springs 102 is compressed completely and load is gradually transferred to coil spring 104 with a higher stiffness. Eventually in a situation where the coil springs 102 & 104 are compressed completely, then the load moves to the coil spring 106, which is compressed to absorb shock from the larger bump. Based on the amount of the compression of the three springs arranged in series, the damping coefficient of the adjustable damper is adjusted dynamically, while the vehicle is in motion, so as to ensure that both the springs and the damper are critically damped at all the time, providing maximum comfort to the rider. Thus, the suspension device with a combination of coil springs arranged in series along with a dynamically adjustable damper, effectively provides a smoother ride in all types of terrain. It is to be noted that the usage of three springs in series is only exemplary and any number of springs with variable stiffness may be used in series, according to the requirement. Alternatively, the driver may adjust the damping coefficient of the damper in real time, while the vehicle is in motion, to suit his/her requirements of the amount of comfort provided by the suspension device.

In an alternative embodiment, the springs arranged in series have different coil diameter but same cross sectional wire diameter so as to provide variable stiffness/spring rate. Any number of such springs, with variable coil diameter, maybe used in series according to the requirement.

In one of the embodiments, the springs are joined by welding the inactive coils of the springs forming welded ends 108. However, it is to be noted that various other means of connecting the springs, known in the art maybe used, such as, but not limited to, welding, soldering, fusing, etc. without departing from the scope of the invention.

In an alternative embodiment, the springs can be joined either by a sleeve or adapter or any other similar methods known in the art.

A comparative study has been conducted to bring out the efficiency of the present invention as compared to the existing state of the art suspension systems. During experimentation, energy dissipation requirement of the damper is recorded and analysed. Data associated with lower energy dissipation required by damper for larger road reaction obtained during experiment for the two subjects are as following:

(A) Conventional Hyundai i10® spring:
  Spring Stiffness—20 N/mm–K
  Free Length—350 mm
  Maximum Deflection—175 mm–x
  Maximum Force—3500 N=Kx
  Maximum Energy Stored—306250 Nmm=½ Kx$^2$ (B) Spring disclosed by the present invention:
  Spring stiffness—17, 20 & 35 N/mm—$K_1$, $K_2$ & $K_3$
  Free length—100, 150 & 100 mm respectively
  Maximum deflection—50, 75 & 50 mm respectively—$x_1$, $x_2$ & $x_3$
  Maximum force—4100 N=$K_1x_1+K_2x_2+K_3x_3$
  Maximum energy stored—121250 Nmm=½($K_1x_1^2+K_2x_2^2+K_3x_3^2$)

Where,
x=deformation of conventional spring, in mm
x1=deformation of spring 100, in mm
x2=deformation of spring 200, in mm
x3=deformation of spring 300, in mm
K=Stiffness of conventional spring, N/mm (20 N/mm)
K1=Stiffness of spring 100, N/mm (17 N/mm)
K2=Stiffness of spring 200, N/mm (20 N/mm)
K3=Stiffness of spring 300, N/mm (30 N/mm)
For all the maximum deflections, 50% of free length has been considered.

In the above comparison, energy stored in the spring is the energy required to be dissipated by the damper. With the proposed selection of spring stiffness's, the energy stored by the proposed spring is much lesser than the one stored in a conventional spring, with a rise in maximum force corresponding to maximum deflection.

Figure 2:
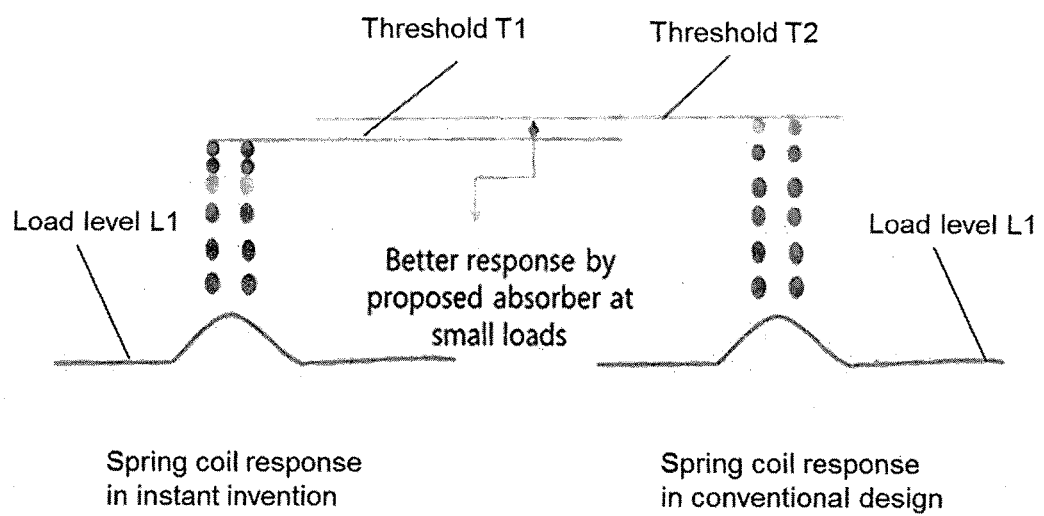
FIG. 2 illustrates a schematic representation of the response by shock absorber at smaller road reaction.

FIG. 2 illustrates the schematic representation of a spring coil in action for softer or smaller road reactions. The spring coil disclosed by the present invention starts responding at softer loads. As shown in FIG. 2, the load level (L1) is represented by a base line having a curve in proportion to load applied. The dotted lines indicate the coils of the spring, while the colours and distance between the dots indicate the compression level of the same viz. the red colour indicates that the coil being fully compressed and green colour indicates the uncompressed state, while yellow colour indicates that the coil is bearing the load but not fully compressed yet. As illustrated, the threshold (T1) of the suspension device disclosed by the present invention is comparatively lower than the threshold (T2) of the conventional device at lower loads. This illustrates that the disclosed suspension device of the present invention comprising of coil springs of variable stiffness along with the dynamically adjustable damper which adjusts the damping coefficient based on the amount of spring compression identified, responds better than the conventional suspension device at lower load and hence, provides a greater comfort.

Figure 3:
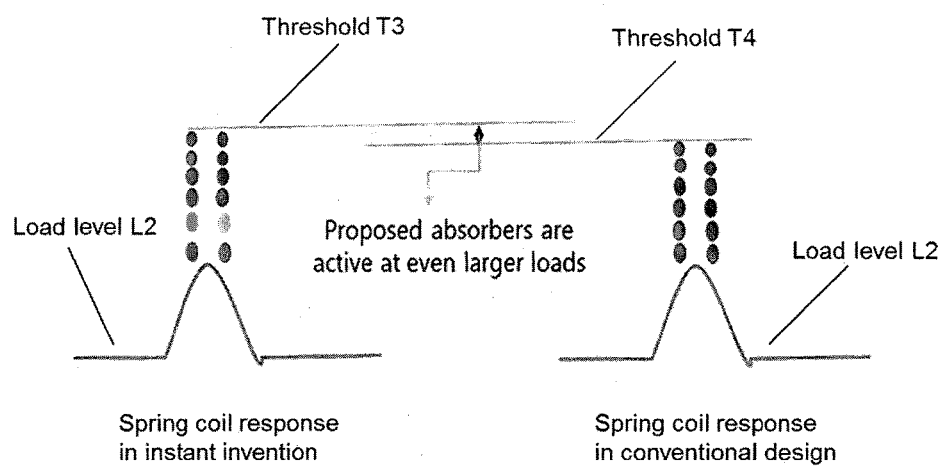
FIG. 3 illustrates a schematic representation of the response by shock absorber at larger road reaction.

FIG. 3 illustrates a schematic representation of the response by shock absorber at larger road reaction. As shown in FIG. 3, the load level (L2) is represented by a base line having a curve in proportion to load applied. The dotted lines indicate the coils of the spring, while the colours and distance between the dots indicate the compression level of the same viz. the red colour indicates that the coil being fully compressed and green colour indicates the uncompressed state, while yellow colour indicates that the coil is bearing the load but not fully compressed yet. By the comparative analysis of heavy load testing, as illustrated in FIG. 3, the shock absorbers of the suspension device disclosed by the present invention remains active even at larger loads. Therefore a "passive spring with differential spring rate" along with the dynamically adjustable damper offers a greater suspension range with good response at both smaller loads and larger loads, as opposed to the conventional spring.

Figure 4A:
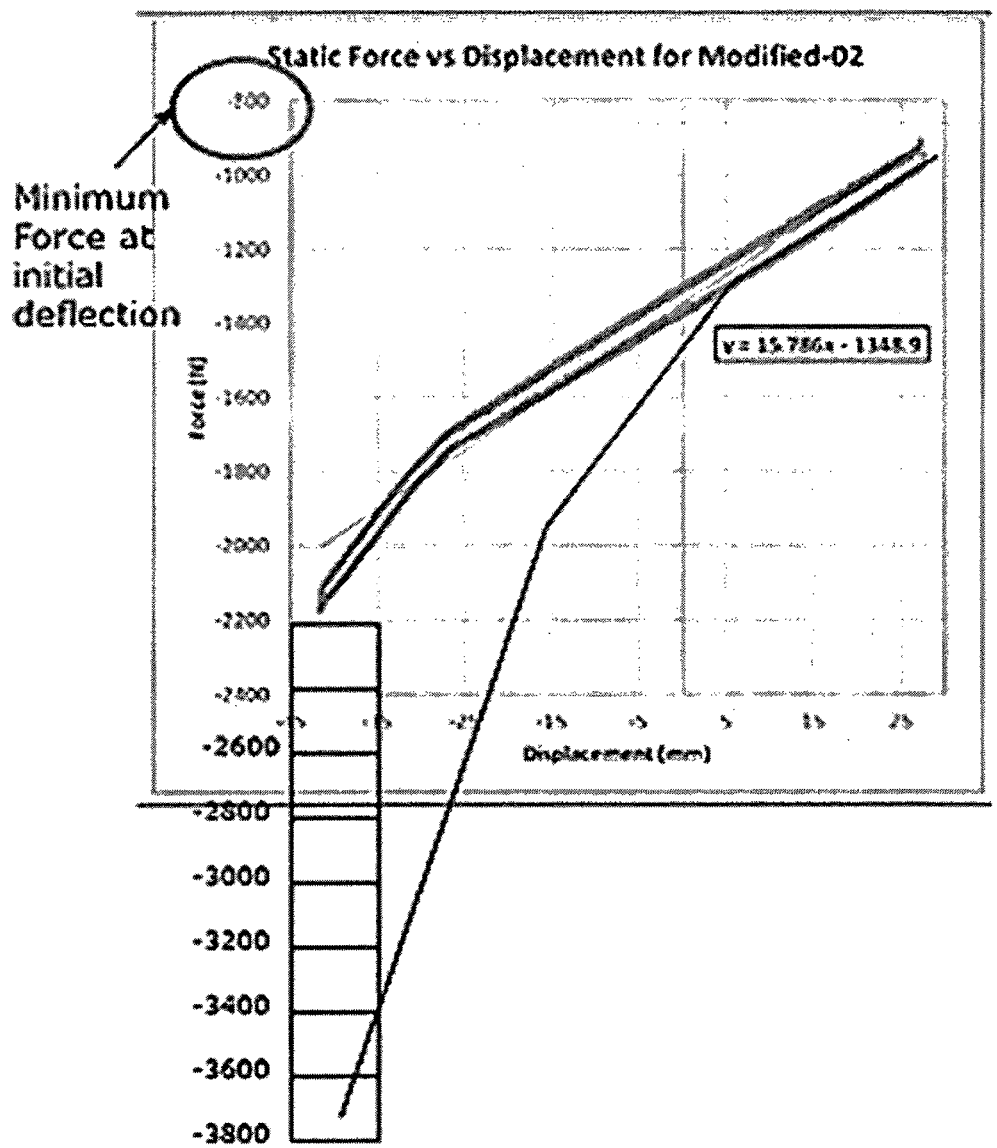
FIG. 4A illustrates graph plotted for test result of stiffness curve for shock absorber disclosed by the present invention.

FIG. 4A illustrates a graph plotted for the test result of stiffness curve for shock absorber disclosed by the present invention. As shown in FIG. 4A, the graph is plotted for static force (x axis) and displacement (y axis) based on the experimental data. The different slopes evidently prove that with spring rate of new slopes it is feasible to achieve both lower and higher stiffness with a same spring having different spring rates (viz. $K_1$, $K_2$, and $K_3$). Deflection starts at 800 N; thus, it offers smoother ride in a soft road reaction. Further, it can be designed for values larger than 3300 N, thus can offer smooth ride in even harsh road reaction. Thus, making the spring suspension with the dynamically adjustable damper of the present invention suitable to be deployed in all types of terrain or any segment of vehicle.

Figure 4B:
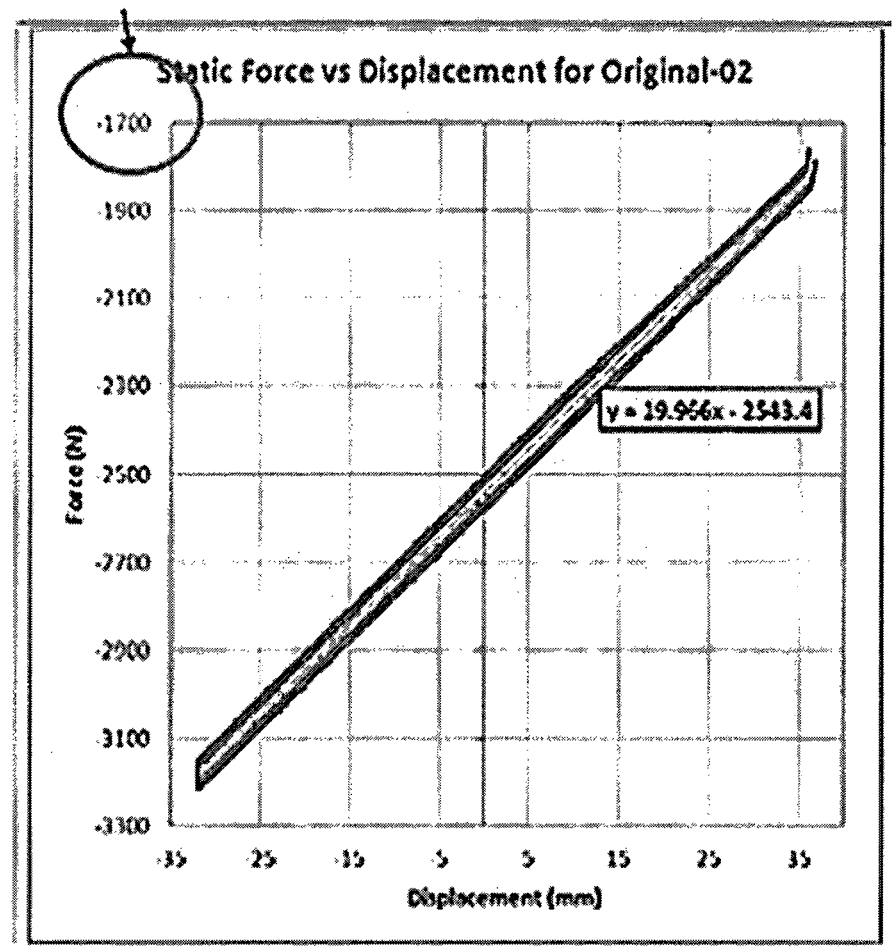
FIG. 4B illustrates graph plotted for test result of stiffness curve for conventional shock absorber.

FIG. 4B illustrates graph plotted for test result of stiffness curve for conventional shock absorber. As shown in FIG. 4B, the graph is plotted for static force (x axis) and displacement (y axis) based on the experimental data. The graph indicates a limited range of minimum force at initial deflection and a maximum force the spring can absorb. Deflection of the conventional spring starts only at 1700N, anything below that level is directly transferred to the body. Further, the conventional spring can take a maximum load of 3300N, while anything above that level is transferred to the body. Thus, the conventional shock absorber had the capability to handle only a limited range of load at a given time.

FIGS. 4A and 4B shows the test results of spring coil disclosed in the present invention and conventional spring, the former starts reacting at 800 N whereas latter only responds at 1700 N. Therefore, the disclosed suspension device is offers excellent shock absorption at both softer road reaction and harder road reaction.

It is to be appreciated that the dynamically adjustable vehicle suspension device having multiple series spring suspension can be designed for any practical value of maximum load and minimum load. Most importantly, the adjustment of stiffness does not involve any significant increase in cost of the suspension device/product or any major modifications to the suspension system.

Figure 5:
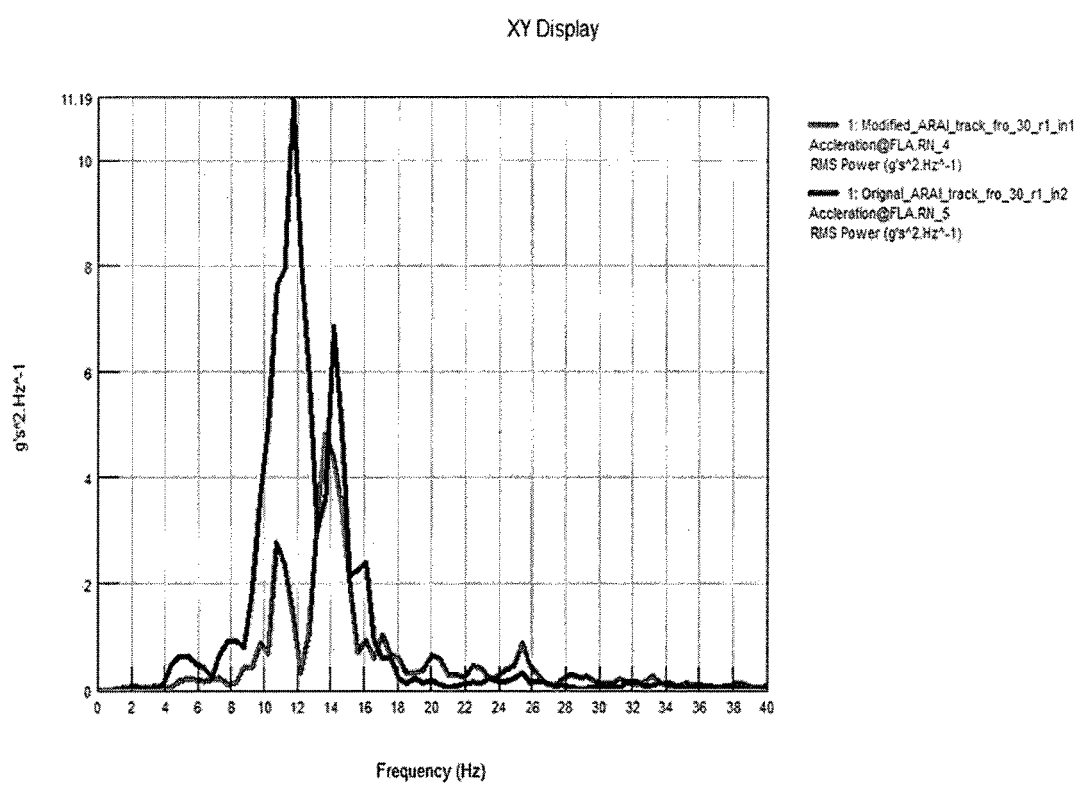
FIG. 5 illustrates a power spectral density curve of front left axle in one aspect of the invention.

FIG. 5 illustrates a power-spectral-density (PSD) curve of front left axle in one aspect of the invention. The graph shows the power spectral density of front left axle and the energy transferred with spring coil disclosed in the present invention is much lesser (58%) than conventional one. Power Spectral Density curves for conventional springs and spring coil according to the present invention shows that the maximum energy transferred to axle in case of the present invention is much lower than that of the conventional spring.

Figure 6:
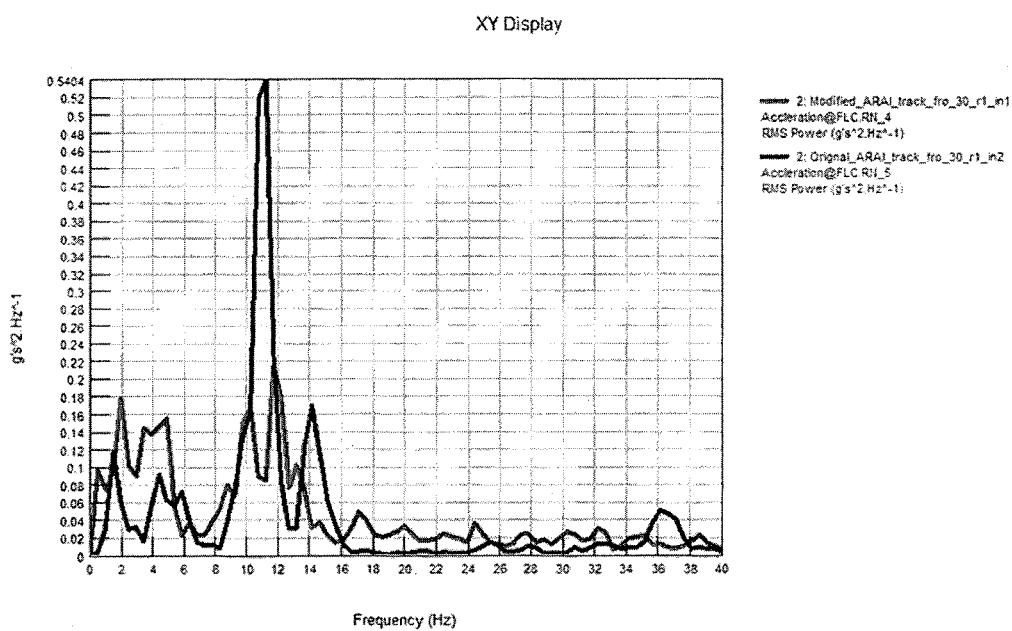
FIG. 6 illustrates a power spectral density curve of front left chassis in one aspect of the invention.

FIG. 6 illustrates a power-spectral-density (PSD) curve of front left chassis in one aspect of the invention. This shows the power spectral density of front left chassis and the energy transferred is 63% lesser than the conventional one at the peak. Thus, values plotted in the graph validates that the vehicle suspension device having multiple series spring coil suspension with series spring coil has a greater suspension range with lesser energy transferred to chassis.

The springs are arranged in a pre-defined configuration depending on multiple factors such as, but not limited to, the requirement of terrain or type of segment of vehicle. In one embodiment, the pre-defined configuration comprises an arrangement of the one or more springs in series such that springs having different spring rates are coupled to form a single spring providing a variable spring rate along with the dynamically adjusted damping coefficient to provide the optimized suspension.

In an alternative embodiment, the pre-defined configuration comprises of only a single spring with a variable cross sectional diameter to provide a variable spring rate. Based on the amount of the compression of the single spring, the damping coefficient of the adjustable damper is adjusted dynamically, while the vehicle is in motion, so as to ensure that both the spring and the damper are critically damped at all the time, providing maximum comfort to the rider. Thus, the suspension device with a single spring along with a dynamically adjustable damper, effectively provides a smoother ride in all types of terrain. Alternatively, the driver may adjust the damping coefficient of the damper in real time, while the vehicle is in motion, to suit his/her requirements of the amount of comfort provided by the suspension device.

In yet another embodiment, the pre-defined configuration comprises an arrangement of the one or more springs having different spring rates parallel to each other, wherein a spring having a lower spring rate is compressed prior to other one or more springs having relatively higher spring rates. Based on the amount of the compression of the springs arranged in parallel, the damping coefficient of the adjustable damper is adjusted dynamically, while the vehicle is in motion, so as to ensure that both the spring and the damper are critically damped at all the time, providing maximum comfort to the rider. Thus, the suspension device with springs arranged in parallel along with a dynamically adjustable damper, effectively provides a smoother ride in all types of terrain. Alternatively, the driver may adjust the damping coefficient of the damper in real time, while the vehicle is in motion, to suit his/her requirements of the amount of comfort provided by the suspension device.

In yet another alternate embodiment, the pre-defined configuration comprises an arrangement of the one or more springs in a hybrid manner having a combination of arrangement of the one or more springs in series and/or parallel. Based on the amount of the compression of the springs arranged in the hybrid configuration, the damping coefficient of the adjustable damper is adjusted dynamically, while the vehicle is in motion, so as to ensure that both the spring and the damper are critically damped at all the time, providing maximum comfort to the rider. Thus, the suspension device with a hybrid spring configuration along with a dynamically adjustable damper, effectively provides a smoother ride in all types of terrain. Alternatively, the driver may adjust the damping coefficient of the damper in real time, while the vehicle is in motion, to suit his/her requirements of the amount of comfort provided by the suspension device.

The adjustable vehicle suspension device of the invention may be advantageously applied as a shock-absorber or a fork to any mechanical system involving the use of springs such as, but not limited to, vehicles, heavy duty trucks, off-road vehicle, campers, quads, and motorcycles of any kind.

The multiple spring suspension may be used purely as a mechanical system in a vehicle. Alternatively, the multiple spring suspension may be controlled via an electronic system, wherein different dampers are actuated by a control logic based on the vehicle type, spring stiffness, terrain, etc.

Figure 7A:
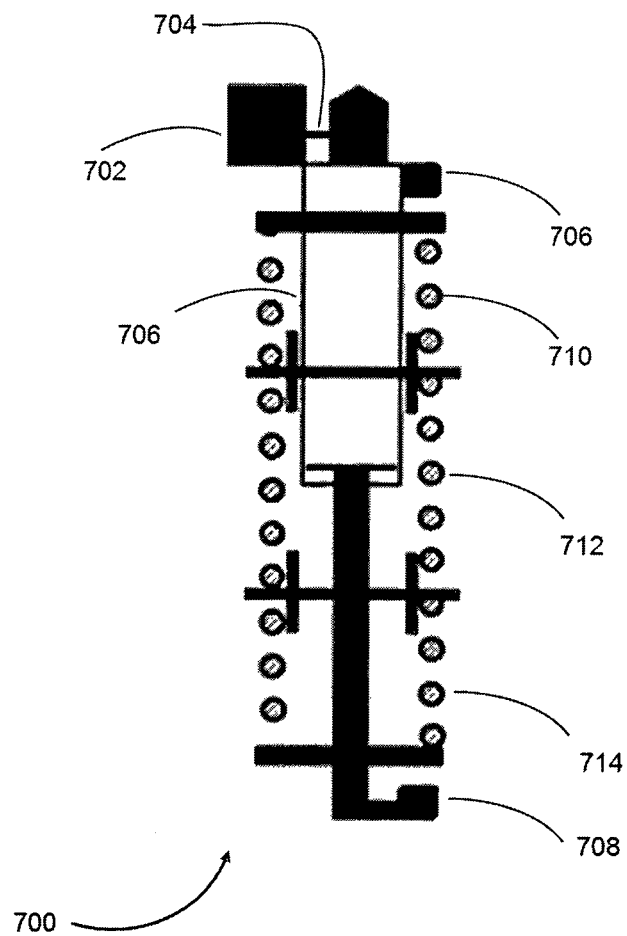
FIGS. 7A and 7B illustrate arrangement of various springs in the electronically adjustable vehicle suspension device for two positions, one fully elongated and the other fully compressed, according to one embodiment.
Figure 7B:
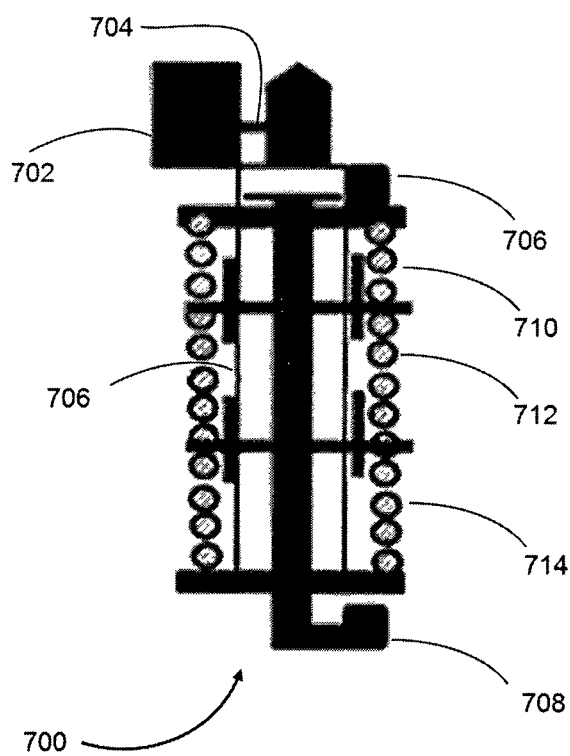

FIGS. 7A and 7B illustrate arrangement of various springs in series in the dynamically adjustable suspension device for two positions, fully elongated and fully compressed, regulated via an electronic system, according to one embodiment. A dynamically adjustable damper 716 is used along with the spring suspension of the invention to enhance the suspension efficiency and provide a greater comfort. As shown in FIGS. 7A and 7B, the suspension device is having a set of springs (710, 712 & 714) having variable stiffness. The stiffness of the spring 710 is minimum and that of the spring 714 is maximum. The spring 712 has stiffness in between 710 and 714. The variation in stiffness is achieved by selecting springs with different coil diameter, different wire diameter or different material. However, preferably, the variation in stiffness is achieved by selecting springs with either different coil diameter or different wire diameter. The number of springs having different stiffness/spring rate may vary as per the requirement of terrain or type of vehicle.

The adjustable damper 716 has a rotatable knob 704 fitted on top of it. The rotation of knob changes the orifice diameter which in turn changes the damping coefficient. The present invention provides for a means to rotate the knob i.e. actuator 702. It is to be noted, that any other means known in the art maybe used for rotating the knob. In one of the embodiments, the motor actuates the knob electronically. In an alternate embodiment, the above can also be done by using a mechanical linkage which rotates the knob as a function of piston travel of damper i.e., using the motion of shock absorber.

Further, the dynamically adjustable damper is provided with means to identify amount of compression of the one or more springs, arranged in various per-defined configurations, by sensing one or more positions, between a fully elongated state and a fully compressed state. The damping coefficient of the damper is then dynamically adjusted based on the amount of spring compression of one or more springs arranged in various pre-defined configurations, while the vehicle is running. Thus, the device adjusts itself dynamically for all the states of spring compressions received as an input in real time. Hence, the dynamic adjustment is a continuous process while the vehicle is in motion. Thus, the one or more springs and the dynamically adjustable damper work in tandem to provide an optimized suspension providing maximum comfort to the rider. This provides a synergistic effect in terms of quality of shock absorption and comfort to traveller/rider. Alternatively, the driver may adjust the damping coefficient of the damper in real time, while the vehicle is in motion, to suit his/her requirements of the level of comfort provided by the suspension device.

In one embodiment, the identification of compression of the one or more springs by sensing one or more positions is achieved by deploying a set of ultrasonic transmitter and receiver fitted at the top and bottom of the suspension device, respectively. Ultrasonic transmitter 706 and receiver 708 senses the various positions of the damper 716 i.e. any position including and between a fully elongated damper and a fully compressed damper. Alternatively, any distance sensor can used identify the amount of spring compression. It is to be noted that any other similar means known in the art may be utilized to identify the amount of spring compression.

Based on the damper position, the actuator 702 turns the knob 704 to achieve a desired damping coefficient. The damping coefficient is minimum when the damper 716 is completely elongated (FIG. 7A), and it is maximum when it is completely compressed (FIG. 7B). The combination of dynamically adjustable damper 716 and spring suspension acts such that when a softer load is experienced, the spring with minimum stiffness 710 deforms first and damping coefficient is also correspondingly low. As the compression continues, the springs (arranged in series) with larger stiffness 712, 714 come into play and the damping coefficient also increases. The present invention allows both, the one or more springs and the dynamically adjustable damper, to be critically damped at all point providing maximum comfort to the passengers. Alternatively, the driver may adjust the damping coefficient of the damper in real time, while the vehicle is in motion, to suit his/her requirements of the amount of comfort provided by the suspension device.

The existing adjustable dampers in market offer damper adjustment while the vehicle is in garage or in static condition and it cannot be controlled dynamically. The existing active suspension systems do not provide for a coil spring-based suspension system which is dynamically adjustable in real-time, while the vehicle is in motion. Additionally, the existing suspension systems do not provide for a suspension where, both, the springs and the damper, are critically damped at all the times while the vehicle is running. With the existing spring based suspension systems, since the damping coefficient cannot be adjusted dynamically, while the vehicle is in motion, the springs are either over damped or under damped, depending on the pre-set damping coefficient. Thus, the comfort level provided to the rider is not the best. Whereas, with the dynamically adjustable suspension device of the present invention, the damper is automatically tuned to critically damp the corresponding spring(s) in real-time, while the vehicle is running, providing maximum level of comfort to the rider. Thus, with the spring design and the adjustable damper of the present invention, which work in tandem, the vehicle suspension can be adjusted dynamically in real-time, while the vehicle is being driven, depending on multiple factors like the road type, terrain, vehicle type, etc. providing greater comfort to the passengers.

Additionally, a control may be provided on the dashboard for dynamic adjustment of the vehicle suspension device by the rider. The dashboard is provided with one or more rotatable knobs or switches or buttons or combination thereof that is adjusted by the driver, while driving, for adjusting the degree of comfort provided by the suspension system of the present invention. For example, just like a volume knob, the driver manually adjusts the knob until he/she feels comfortable such that the suspension performance of the vehicle is optimized. The rotation of the knob by the user varies the damping coefficient of the damper, which in turn ensures optimum damping of the springs arranged in various configurations, as per the comfort requirement of the user. Thus, the user sets the damping coefficient of the damper as per his/her requirement of the comfort level, by rotating the knob, providing maximum level of comfort to the rider.

In an alternate embodiment, a digital user interface with a touch screen is provided where the driver can provide inputs, like, but not limited to, vehicle type, road type, terrain, age of vehicle, age of suspension, vehicle payload, etc. Various input parameters are calibrated to provide a pre-set optimized suspension performance for different input values. The ECU reads these input signals and depending on these input parameters, the control logic tunes the suspension system of the vehicle to optimize the damping coefficient for different spring positions. Thus, the suspension system of the invention provides maximum level of comfort to the passengers, at all times of the drive.

Figure 8A:
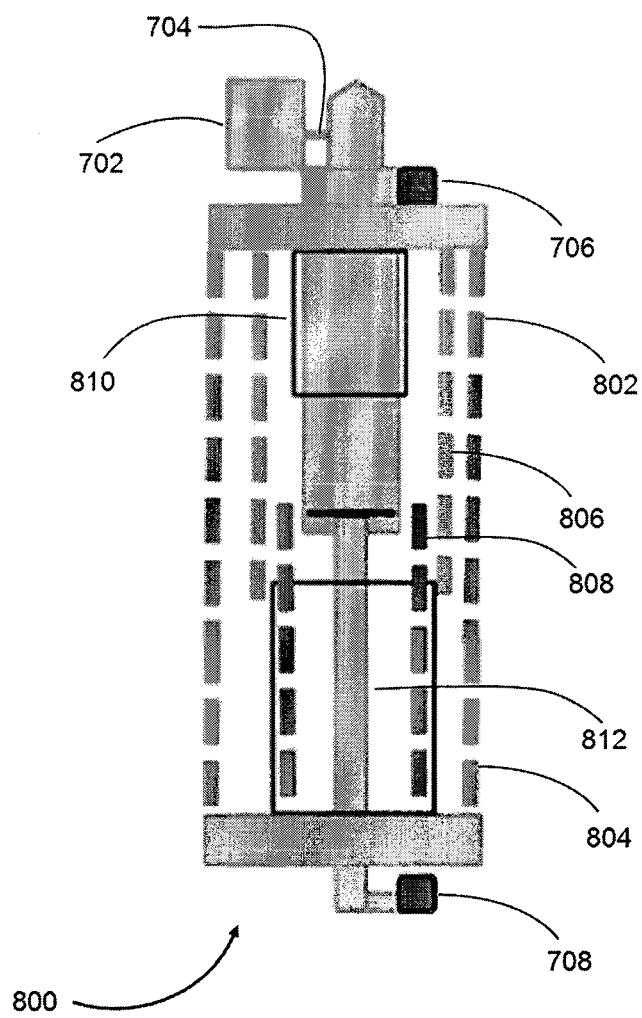
FIGS. 8A and 8B illustrate hybrid arrangement of various springs in the dynamically adjustable vehicle suspension device for two positions, one fully elongated and the other fully compressed, according to one embodiment.
Figure 8B:
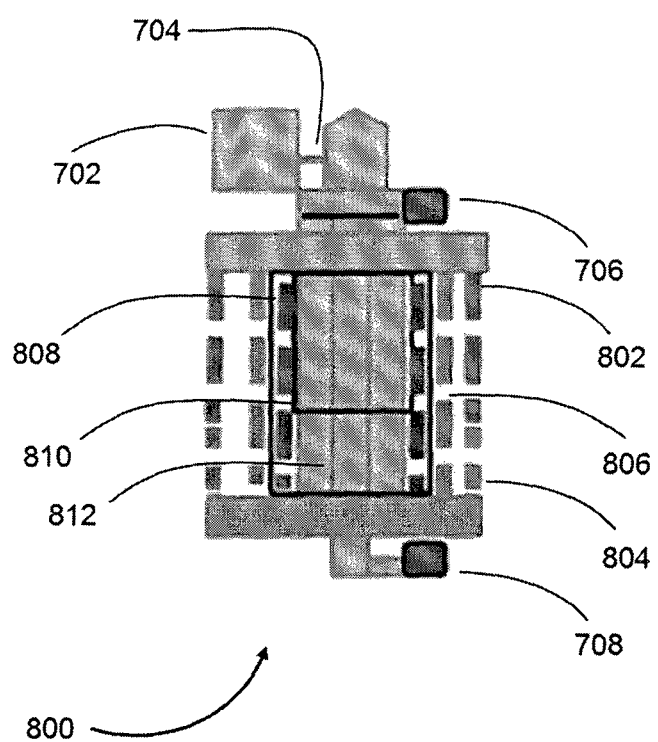

FIGS. 8A and 8B illustrate a hybrid arrangement of various springs in the dynamically adjustable vehicle suspension device for two extreme positions, fully elongated position and a fully compressed position, regulated via an electronic system, according to one embodiment. The hybrid arrangement comprises of a set of springs that are arranged in a combination of a series configuration and a parallel configuration, further enhancing the efficiency of the spring suspension arrangement and hence providing a greater comfort.

Spring 802 and spring 804 are arranged in series with each other, such that they offer response to the road reaction during the initial compression of spring. Spring 806 and spring 808 are arranged parallel to each other and to the spring 802 and the spring 804. Tube 810 and tube 812 are hollow concentric cylinders made up of mild steel and act as guide for springs such that the tube 810 can completely sit inside the tube 812, when the shock absorber is in a fully compressed state. Tube 810 acts as a guide for the spring 808 whereas the tube 812 acts as a guide for the spring 806. The arrangement of the dynamically adjustable damper is similar to that of the embodiment illustrated in FIGS. 7A and 7B.

During the initial movement of the shock absorber, only the series combination of the spring 802 and the spring 804 is active, thus offering an excellent response to smaller road reaction. As the shock absorber is further compressed, the spring 806 hits the bottom end support and comes in parallel to the springs 802 & 804. Since, the spring 806 is now in parallel, it offers a greater stiffness; thus, the combination can now take a larger road reaction. On further compression, the spring 808 touches the upper end support. It now comes into effect and is parallel to spring 802, spring 804 and spring 806. Now, the hybrid combination of springs in a single shock absorber can take softer as well as much larger road reaction. In the fully compressed state, as depicted by FIG. 8B, the tube 810 completely sits inside the tube 812. The coil diameter of the spring 808 is least whereas the spring 806 has a larger coil diameter. The springs 802 & spring 804 has the same and largest coil diameter. Based on the amount of the compression of the springs arranged in the hybrid configuration, the damping coefficient of the adjustable damper is adjusted dynamically, while the vehicle is in motion, so as to ensure that both the spring and the damper are critically damped at all the time, providing maximum comfort to the rider. Thus, the suspension device with the springs arranged in a hybrid configuration along with a dynamically adjustable damper, effectively provides a smoother ride in all types of terrain. Alternatively, the driver may adjust the damping coefficient of the damper in real time, while the vehicle is in motion, to suit his/her requirements of the amount of comfort provided by the suspension device.

The coil diameter or the cross sectional wire diameter of multiple springs utilized can be same or different, depending upon the vehicle and road type it has been designed for. For example, in a passenger car, the payload is not very high as compared to the kerb weight; thus, the required suspension range is not very high. Hence, all springs of a same wire diameter maybe used. In case of commercial vehicles where payload is much greater than the kerb weight, the required suspension range is very high. Hence, wires with different cross sectional area are used to achieve a better suspension.

Springs made up of standard material, maybe used. However, any other material, known in the art, matching the required mechanical properties, may also be used.

As seen, the present invention can be effectively used in any application where a suspension range is required. Apart from passenger cars, it can be used in light weight commercial vehicles where there is a huge difference in kerb weight and the payload. It is applicable for suspension systems in various types of vehicles, but not limited to, like, heavy duty vehicles, military vehicles, off-road vehicles, etc. It can also be used in automation industry where effective suspension is required. Either of the above proposed system or a combination of any can be used to achieve large suspension range without substantial change in suspension dimensions making it cost effective.

Suspensions being a generic requirement, invention is not limited to automotive application and maybe used in any other applications, especially in a condition where it requires isolation in all terrains i.e. military, robotics etc.

While specific embodiments of the invention have been described in detail, those with ordinary skill in the art will appreciate that various modifications and alternatives to those details could be developed in the light of the overall teachings of the disclosure. For example, for the multiple series spring embodiment any number of springs maybe used in a series configuration, for the hybrid arrangement embodiment any number of springs maybe placed in series and any number of springs placed in parallel, for both the series and hybrid spring arrangement either the coil diameter maybe varied or the wire diameter maybe varied or a combination of both maybe utilized, and the like. With respect to the above description, it is to be realized that various modifications may be applicable, in size, materials, shape, form, function and manner of operation, assembly and use, and are deemed readily apparent and obvious to one skilled in the art. All equivalent relationships to those illustrated in the drawings and described in the specification are intended to be encompassed by the present invention. The examples used to illustrate the embodiments of the present invention, in no way limit the applicability of the present invention to them.

We claim:

1. A dynamically adjustable suspension device, comprising:
   a plurality of springs having a plurality of spring rates, said plurality of springs being arranged in a pre-defined configuration, such that the plurality of springs are coupled to provide a variable spring rate; and
   a dynamically adjustable damper, comprising:
      a rotatable knob coupled to the dynamically adjustable damper to change an orifice diameter of the dynamically adjustable damper thereby changing a damping coefficient dynamically in real-time;

an actuator configured to rotate the knob so as to adjust the damping coefficient in real-time while the dynamically adjustable suspension device is being used; and a sensor configured to identify a compression one or more of the plurality of springs by sensing one or more positions, between a fully elongated position and a fully compressed position, in real-time, wherein the damping coefficient is dependent on the compression position of the plurality of springs, and wherein the one or more springs and the dynamically adjustable damper work in tandem to provide adjustments to a suspension;

wherein both the plurality of springs and the dynamically adjustable damper are critically damped at all points;

wherein the plurality of springs are arranged in series such that the plurality of springs having different spring rates are coupled to form a single spring along with the dynamically adjusted damping coefficient to provide the suspension;

wherein the plurality of springs comprises a first spring having a first spring rate and a second spring having a second spring rate higher than the first spring rate;

wherein the second spring is configured to be rigid when the first spring compresses; and wherein the second spring is configured to compress when the first spring is completely compressed.

2. The dynamically adjustable suspension device of claim 1, wherein the dynamically adjustable suspension device is deployed in a vehicle, wherein the damping coefficient is adjusted in real-time and the one or more springs and the dynamically adjustable damper are critically damped at all points while the vehicle is in motion.

3. The dynamically adjustable suspension device of claim 1, wherein the plurality of different spring rates of the plurality of springs are achieved by differing at least one of a coil diameter or a wire diameter.

4. The dynamically adjustable suspension device of claim 1, wherein the plurality of springs having different spring rates are arranged parallel to each other, and wherein a first spring of the plurality of springs having a lower spring rate is compressed prior to one or more second springs of the plurality of springs having one or more spring rates higher than the lower spring rate along with the dynamically adjusted damping coefficient to provide the suspension.

5. The dynamically adjustable suspension device of claim 1, wherein the plurality of springs are arranged in a hybrid manner having a combination of arrangement of the plurality of springs in series and parallel along with the dynamically adjusted damping coefficient to provide the suspension.

6. The dynamically adjustable suspension device of claim 1, wherein the pre-defined configuration comprises of an arrangement of a single spring with a variable wire diameter providing a variable spring rate along with the dynamically adjusted damping coefficient.

7. The dynamically adjustable suspension device of claim 1, wherein the actuator comprises at least one of a motor or at least one mechanical link using a motion of a shock absorber.

8. The dynamically adjustable suspension device of claim 1, wherein the sensor comprises an ultrasonic transmitter positioned at a top of the dynamically adjustable suspension device and an ultrasonic receiver fitted at a bottom of the dynamically adjustable suspension device.

9. The dynamically adjustable suspension device of claim 1, wherein the sensor is a distance sensor.

10. The dynamically adjustable suspension device of claim 1, further comprising a user interface structured to allow a user to control the actuator while a vehicle is in motion.

11. The dynamically adjustable suspension device of claim 10, wherein the user interface is a manual interface comprising at least one of one or more additional rotatable knobs, one or more switches, or one or more buttons to adjust the dynamically adjustable suspension device while the vehicle is in motion.

12. The dynamically adjustable suspension device of claim 10, wherein the user interface is a digital interface comprising display unit with a touch screen enabling the user to input data associated with at least one of a vehicle type, a road type, a terrain, an age of the vehicle, an age of the suspension, or a vehicle payload.

13. The dynamically adjustable suspension device of claim 12, wherein the digital interface enables the user to choose one or more pre-defined conditions with reference to the at least one of the vehicle type, the road type, the terrain, the age of the vehicle, the age of the suspension, and the vehicle payload.

14. A suspension device for a vehicle, comprising:

a plurality of springs arranged in a configuration, wherein the plurality of springs are combined to provide a varying spring rate, and wherein the two or more springs are structured to compress by different amounts in response to a force on the suspension device while the vehicle is in motion; and a damper system having an adjustable damping coefficient, the damper system comprising:

a sensor configured to identify a compression of one or more of the plurality of springs by sensing one or more positions, between a fully elongated position and a fully compressed position, in real time, wherein the damping coefficient is dependent on the compression position of the plurality of springs;

a damper defining an orifice diameter; and an actuator configured to change the orifice diameter based on the position of the plurality of the springs measured by the sensor;

wherein the plurality of springs and the damper system operate together to provide a suspension for the vehicle while the vehicle is in motion, wherein the different spring rates of the plurality of springs are configured to dampen an impact of varying amounts of force on the suspension device and the damper system and manual damper adjustment device are configured to allow the user to adjust a stiffness of the suspension provided by the plurality of springs;

wherein the plurality of springs are arranged in series such that the plurality of springs having different spring rates are coupled to form a single spring along with the dynamically adjusted damping coefficient to provide the suspension;

wherein the plurality of springs comprises a first spring having a first spring rate and a second spring having a second spring rate higher than the first spring rate;

wherein the second spring is configured to be rigid when the first spring compresses; and wherein the second spring is configured to compress when the first spring is completely compressed.

15. The suspension device of claim 14, wherein the plurality of springs and the damper system are configured to be critically damped at all operating points while the vehicle is in motion.

16. The suspension device of claim 14, wherein the different spring rates are achieved by differing at least one of a coil diameter or a wire diameter.

17. The suspension device of claim 14, wherein the configuration comprises a series configuration of the two or more springs having the different spring rates, wherein the two or more springs in the series configuration combine to provide a spring system having the variable spring rate in response to the varying amounts of force on the suspension device.

18. The suspension device of claim 14, wherein the configuration comprises a parallel configuration of the two or more springs having the different spring rates, wherein a first spring of the two or more springs has a lower spring rate than a second spring of the two or more springs, and wherein the two or more springs are configured such that the first spring is compressed prior to the second spring in response to the force on the suspension device.

19. The suspension device of claim 14, wherein the configuration comprises a hybrid configuration in which a first set of the plurality of springs are arranged in series and a second set of the plurality of springs are arranged in parallel.

20. The dynamically adjustable suspension device of claim 1, wherein:
the plurality of springs further comprises a third spring having a third spring rate higher than the first spring rate and the second spring rate;
the third spring is configured to be rigid when the first spring and second spring compress; and
the third spring is configured to compress when the first spring and second spring are completely compressed.

21. The dynamically adjustable suspension device of claim 1, further comprising a third spring arranged in parallel with at least one of the first spring or the second spring, wherein the third spring has a third spring rate different from at least one of the first spring rate or the second spring rate.

22. The suspension device of claim 14, wherein:
the plurality of springs further comprises a third spring having a third spring rate higher than the first spring rate and the second spring rate;
the third spring is configured to be rigid when the first spring and second spring compress; and
the third spring is configured to compress when the first spring and second spring are completely compressed.

23. The dynamically adjustable suspension device of claim 14, further comprising a third spring arranged in parallel with at least one of the first spring or the second spring, wherein the third spring has a third spring rate different from at least one of the first spring rate or the second spring rate.

* * * * *